3,235,798
METHOD AND APPARATUS FOR AUTOMATIC RECORDING OF THE SPECTRUM OF LIGHT-EMITTING OBJECTS
Maximilian Julius O. Strutt, Zurich, Switzerland, assignor to Pretema A.G., Zurich, Switzerland
Filed May 2, 1960, Ser. No. 26,225
Claims priority, application Switzerland, May 4, 1959, 72,866/59
7 Claims. (Cl. 324—77)

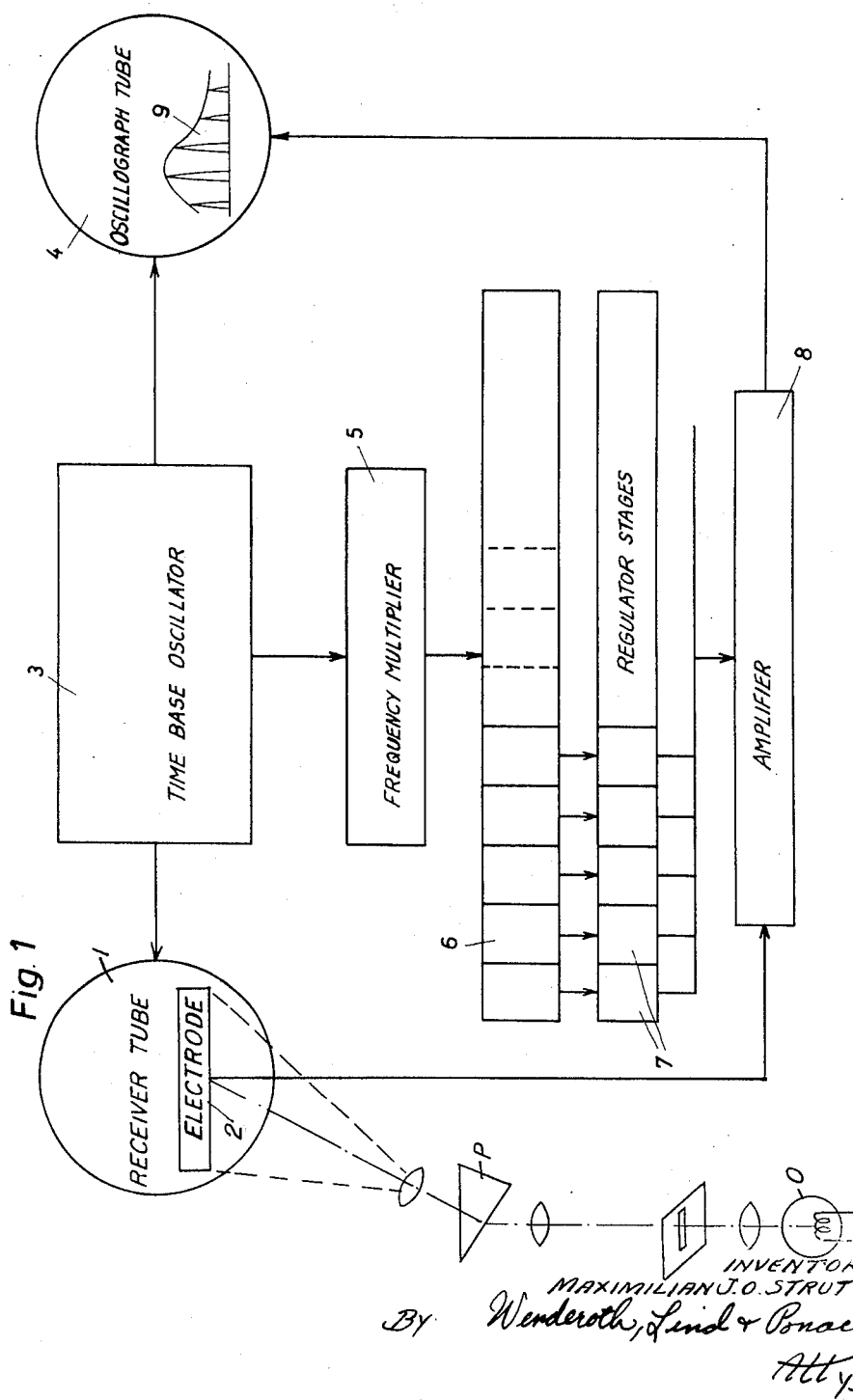

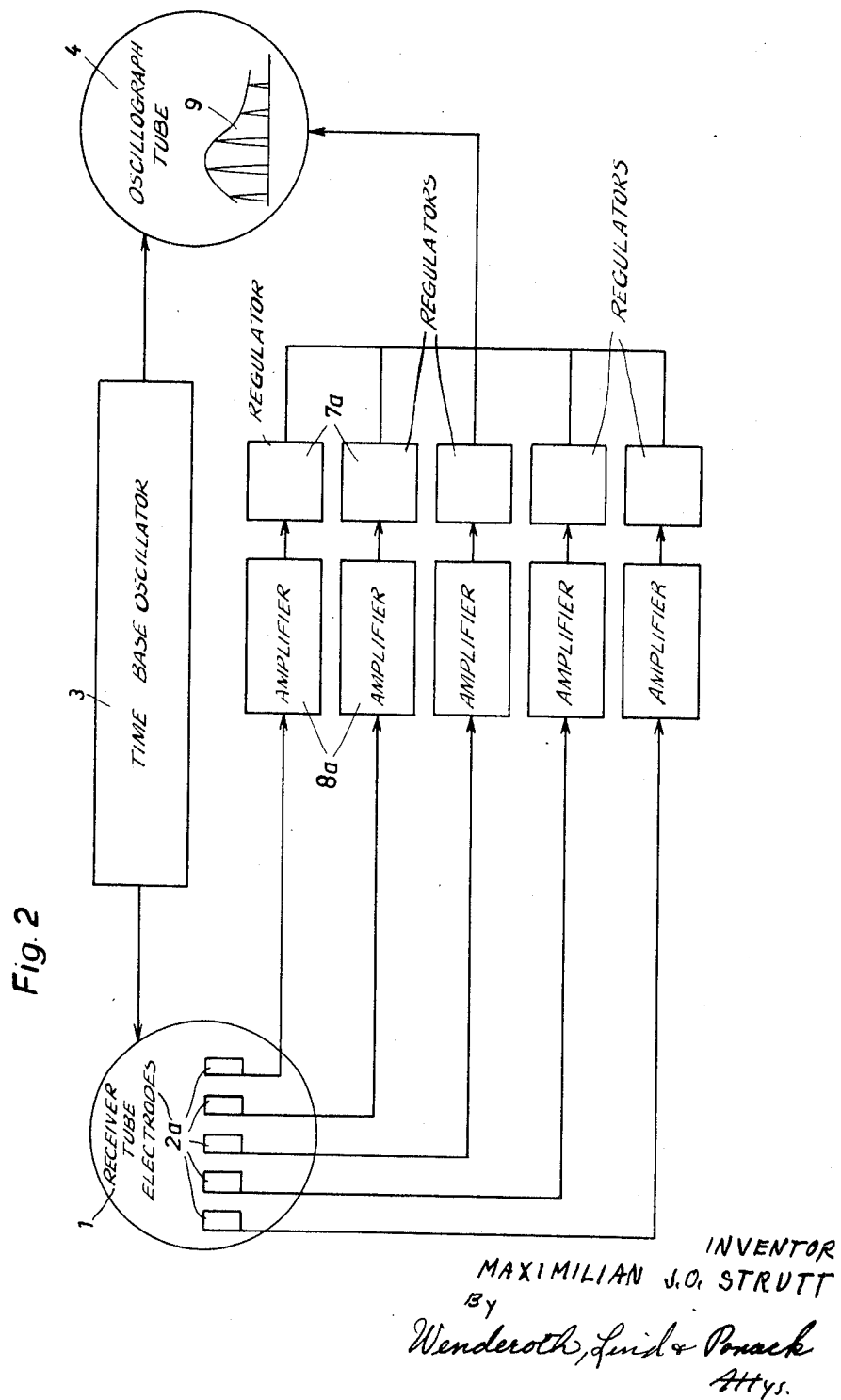

The present invention relates to a method and an apparatus for the automatic indication of the spectrum of objects.

In a known method of this kind a plurality of interference filters are successively moved in their spectral sequence through the path of rays emanating from the object, whereupon the radiation passing the filters is converted into electric voltage impulses by means of which the cathode beam of an electron tube is vertically deflected; the horizontal deflection of the cathode beam is controlled according to the filter sequence. An image corresponding to the sequence of radiation pulses produced by the filters then appears on the screen.

This method actually delivering perfect results is relatively complicated and requires a comparatively voluminous apparatus which must operate with great precision.

It is an object of the invention to avoid the drawback mentioned above and to provide a novel method for automatically indicating the spectrum of objects. According to the invention this method comprises the steps of projecting the spectrum emanating from the object onto the screen of a cathode ray tube, the cathode ray of which scanning the spectral image in the direction of the wave length variation to thereby produce a signal corresponding to the local intensity of the spectral image, said signal in the form of voltage pulses corresponding to a sequence of spectral sections being used for the vertical deflection of the cathode beam of an oscillograph tube, which beam is horizontally deflected in timed relation with the scanning of the spectral image, so that on the screen of said oscillograph tube, an image is produced corresponding to the spectral energy distribution of the radiation emanating from the object.

This method basically operates electronically and avoids mechanical operations.

A further object of the invention is the provision of an apparatus for carrying out this method. This apparatus comprises a cathode-ray receiver tube and means for projecting a spectral image of the radiation emanating from the object upon the screen of said tube, a time base oscillator for deflecting the cathode-ray of the receiver tube in order to scan the screen of this tube in the direction of the wave length variation of the spectral image and to simultaneously provide a synchronous horizontal deflection of the cathode-ray of an oscillograph tube, and means for converting the signal which is produced by the moving cathode-ray of the receiver tube, into increased voltage pulses for the vertical deflection of the cathode-ray of the oscillograph tube.

The main elements of the apparatus, which operate purely in electronic manner, are relatively simple in their construction and require only little space.

The method according to the invention will now be described in more detail with reference to the accompanying drawings diagrammatically illustrating, by way of example, two examples of the apparatus according to the invention, and in which:

FIGURE 1 is the circuit diagram of the first example, and

FIGURE 2 shows the circuit diagram of the second example.

The apparatus shown in FIGURE 1 has a cathode-ray receiver tube 1, such as an ionoscope tube or an orthicon tube, with a plane electrode 2. In contradistinction to the conventional receiver tubes used in television, this tube 1 comprises only a simple deflection device for deflecting the cathode-ray in horizontal direction, i.e. in longitudinal direction of the electrode 2. Moreover, means, e.g. a prism P, is provided, by means of which the spectral image of the radiation emanating from the object O is projected on the screen of the tube 1. The said object may be a radiating source (self-radiator), a radiation reflecting medium, or a medium permeable to radiation. The apparatus for horizontally deflecting the cathode-ray of the receiver tube 1 is controlled by a time base oscillator 3 of known construction which at the same time serves for the synchronous control of the horizontal deflection device of a cathode-ray tube 4 of an oscillograph. A frequency multiplier 5, to which is connected a counting impulse circuit 6, follows the time base-oscillator 3. The circuit 6 which counts a desired number of pulses is followed by a corresponding number of regulators 7 for instance potentiometers. In the example shown, five regulators 7 shown in full lines and corresponding to the pulses counted by the counting impulse circuit 6 are provided; it is indicated by dotted lines that any desired greater number of pulses could also be produced. The output of the regulator stage formed by the regulators 7 is connected to a pulse amplifier 8, which is also connected to the electrode 2 of the receiver tube 1. The output of the amplifier 8 is connected to the vertical deflection device of the oscillograph tube 4.

For measuring the spectral energy distribution of the radiation emanating from the object, the spectrum of this radiation is projected onto the screen of the receiver tube 1, namely so as to bring the axis of the wave length variation of the spectrum into the direction of the longitudinal axis of the electrode 2. The cathode-ray of the oscillograph tube 4 which is horizontally deflected by the control action of the time base oscillator 3 produces a signal in the electrode 2, the intensity of which varies with the local intensity of the spectral image. This signal passes into the amplifier 8 and controls there, according to its particular strength, the pulses produced by the counting pulse circuit 6 and capable of being individually varied by means of the adjustable regulators 7. At the output end of the amplifier a series of amplified pulses thus is obtained, which pulses correspond each to the intensity of the radiation at the wave length of the spectrum scanned at the particular instant by the cathode beam of the oscillograph tube 4. This series of pulses is then used in the oscillograph tube 4 for vertically deflecting the cathode-ray which has been horizontally deflected in synchronism with the beam of the receiver tube 1. Thus, on the image screen of the oscillograph tube 4 an image 9 is obtained which is composed of pulses, determined by the pulse counting circuit and spaced side by side in rows by the said horizontal deflection, the amplitude of said pulses being determined by the signal-modulated amplified pulses from the amplifier 8. By means of the regulators 7 a calibration of the device is rendered possible, so that each impulse of the image 9 exactly corresponds to the energy of the radiation portion corresponding to the associated wave length of the radiation spectrum. A still finer distribution of the spectrum or a still more precise image of the energy distribution of this spectrum can be obtained by increasing the number of pulses. Any tube having two control grids, e.g. a pentode or a heptode, can be used as amplifier; transistors could also be provided as amplifying means.

In the example described a continuous signal has been produced by the horizontally deflected radiation of the receiver tube 1 by means of the electrode 2 which signal in turn has been used for the control of individual pulses produced independently of it. In the example according to FIGURE 2, on the other hand, a reeciver tube 1 having a subdivided electrode 2a is used. Moreover, this apparatus also comprises a time base oscillator 3 for the horizontal deflection of the cathode beam of the receiver tube 1 and for the synchronous horizontal deflection of the cathode beam of the oscillograph tube 4. The electrode portions 2a are connected each to one of a series of separate amplifiers 8a, the outputs thereof leading by means of a regulator 7a and a common control wire to the vertical deflection device of the oscillograph tube 4. In the present example again the spectral image of the radiation to be measured is projected onto the screen of the receiver tube 1 and under the controlling action of the time base oscillator 3 is continuously scanned in horizontal direction, i.e., in the direction of the wave length variation of the image. Each time when the cathode beam of the receiver tube 1 scanning the image passes an electrode portion 2a, a pulse is produced the strength of which depends on the local intensity of the radiation. This impulse is amplified in the associated amplifier 8a, is also varied in the following regulator 7a according to the adjustment thereof and subsequently projected by means of the vertical deflection device of the oscillograph tube 4 on the screen thereof. Owing to the synchronisation of the horizontal deflection of the cathode-ray of the oscillograph tube 4 with the scanning in the receiver tube 1, an image 9 is produced, which corresponds to the spectral image on the screen of the receiver tube 1 and indicates the energy distribution of the radiation. The finer the subdivision of the electrode of the receiver tube 1 is selected, the more individual pulses are obtained, which condition results in a correspondingly differentiated image 9 on the screen of the oscillograph tube 4.

Since the individual pulses produced in the electrode portions are staggered in timed succession, they can be fed to a common amplifier similarly to the continuous signal of the example shown in FIGURE 1. However, in order to be able to vary the pulses individually, it is required in this case to send each impulse through a seperate regulator preceding the common amplifier.

The described devices can be originally provided with certain spectral sensitivities according to the adjustment of the various regulators. The flexibility of the apparatus gained thereby renders the latter suitable for the most varied applications. Special fields of application for the apparatus are textile dye-houses, printing-works, coloured film industries, paper mills, etc.

Instead of a receiver tube a plurality of photosensitive elements disposed side by side in a row could be used. The spectrum is then projected on this row of photosensitive elements. The electrodes of the elements receive electric voltages which are transmitted by the impulse amplifier to the oscillograph tube.

I claim:

1. A method of automatically indicating the spectrum of objects, consisting essentially of the steps of projecting a spectrum emanating from an object onto the screen of a cathode ray tube, causing the cathode ray of the tube to scan the image on the screen in the direction of the wave length variation, producing a signal corresponding to the local intensity of the spectral image, producing a series of voltage pulses, modulating and amplifying said pulses with the signal from said spectral image to produce a series of voltage pulses corresponding to a sequence of spectral sections, feeding said voltage impulses to the cathode beam of an oscillograph tube and causing said beam to be deflected vertically by said signals while simultaneously deflecting the beam of said oscillograph tube horizontally in timed relation with the beam of the cathode ray tube which is scanning the screen thereof, whereby there is produced on the screen of said oscillograph tube in image corresponding to the spectral energy distribution of the radiation on emanating from the object.

2. A method as claimed in claim 1 in which the step of producing a signal corresponding to the local intensity of the spectral image comprises scanning the spectrum image continuously to produce a continuous signal, and the step of producing a series of voltage pulses comprises separately producing voltage pulses during the timed interval of scanning of the spectral image and the step of modulating the pulses comprises using the continuous signal from said screen and modulating said voltage pulses with said continuous signal from said screen, and the step of amplifying said voltage pulses comprises amplifying said modulated pulses before feeding them to the cathode beam of the oscillograph tube.

3. A method as claimed in claim 1 in which the step of producing a signal corresponding to the local intensity of the spectral image comprises scanning the spetcral image in a series of steps, each step producing a pulse, and the step of modulating and amplifying said pulses comprises producing from each of the pulses a voltage pulse having an amplitude corresponding to that of the pulse, said voltage pulse being the voltage pulse which is fed to the cathode beam of the oscillograph tube.

4. Apparatus for automatically indicating the spectrum of objects, comprising a cathode ray receiver tube, an electrode in said cathode ray receiver tube, means for projecting a spectral image of the radiation emanating from an object on the electrode of said tube, an oscillograph tube, a time base oscillator connected to said cathode ray receiver tube and to said oscillograph tube for deflecting the cathode ray of the receiver tube for scanning the electrode in the direction of the wave length variation of the spectral image and for horizontally deflecting the cathode ray of the oscillograph tube synchronously with the deflection of the beam of the receiver tube, and means connected to the electrode of the receiver tube and the oscillograph tube for producing a series of voltage pulses and modulating and amplifying said voltage pulses by means of the signal from the electrode to form a series of amplifier voltage pulses for vertically deflecting the cathode ray of the oscillograph tube.

5. An apparatus as claimed in claim 4 in which said cathode ray receiver electrode extends over the entire scanning path of the cathode ray, and said means for producing a series of voltage pulses and modulating and amplifying them comprises an amplifier to which said electrode is connected for feeding the signal from said electrode to said amplifier, a frequency multiplier connected to said time base oscillator and fed thereby, a counting pulse circuit connected to the output of said frequency multiplier, and a regulator stage connected between said counting pulse circuit and said amplifier.

6. An apparatus as claimed in claim 4 in which said cathode ray receiver electrode is subdivided into a plurality of sections separated in the direction of the scanning path of the cathode ray, and said means for producing a series of voltage pulses and modulating and amplifying them comprises a plurality of regulators, one connected to each of said sections of the electrode, and at least one amplifier to which said regulators are connected.

7. An apparatus as claimed in claim 6 in which there are a plurality of amplifiers, one connected to each of said regulators.

References Cited by the Examiner

UNITED STATES PATENTS

| | | | |
|---|---|---|---|
| 2,130,134 | 9/1938 | Iams | 315—9 |
| 2,324,270 | 7/1943 | Schlesman | 315—9 X |
| 2,465,355 | 3/1949 | Cook | 315—26 X |
| 2,474,266 | 6/1949 | Lyons | 315—26 X |
| 2,820,173 | 1/1958 | Raabe | 315—9 |
| 2,870,370 | 1/1959 | Garbuny | 315—9 X |
| 2,871,465 | 1/1959 | Nielsen | 88—14 |

WALTER L. CARLSON, *Primary Examiner.*

RALPH G. NILSON, GEORGE N. WESTBY,
*Examiners.*